(12) United States Patent
Zhao

(10) Patent No.: US 8,015,411 B2
(45) Date of Patent: Sep. 6, 2011

(54) ACTIVE WATERMARKS AND WATERMARK AGENTS

(75) Inventor: Jian Zhao, Providence, RI (US)

(73) Assignee: Thomson Licensing, Boulogne-Billancourt (FR)

( * ) Notice: Subject to any disclaimer, the term of this patent is extended or adjusted under 35 U.S.C. 154(b) by 424 days.

(21) Appl. No.: 11/926,427

(22) Filed: Oct. 29, 2007

(65) Prior Publication Data

US 2008/0056531 A1     Mar. 6, 2008

Related U.S. Application Data

(60) Continuation of application No. 10/872,877, filed on Jun. 21, 2004, now abandoned, which is a division of application No. 09/070,597, filed on Apr. 30, 1998, now Pat. No. 6,754,822.

(51) Int. Cl.
*H04L 9/32* (2006.01)
*G06F 7/04* (2006.01)
*G09C 5/00* (2006.01)
*G06T 1/00* (2006.01)
*G11B 20/00* (2006.01)
*H04N 7/08* (2006.01)
*H04N 1/387* (2006.01)

(52) U.S. Cl. ........ 713/176; 713/177; 713/178; 713/179; 726/26

(58) Field of Classification Search .................. 713/176, 713/177, 178, 179; 726/26
See application file for complete search history.

(56) References Cited

U.S. PATENT DOCUMENTS

| 5,337,360 A | 8/1994 | Fischer |
| 5,710,834 A | 1/1998 | Rhoads |

(Continued)

FOREIGN PATENT DOCUMENTS

WO   WO2004055808   7/2004

(Continued)

OTHER PUBLICATIONS

Thomas Winkler, Bernhard Rinner, "Applications of trusted computing in pervasive smart camera networks", Oct. 2009, WESS '09: Proceedings of the 4th Workshop on Embedded Systems Security, Publisher: ACM, pp. 1-10.*

(Continued)

*Primary Examiner* — Eleni A Shiferaw
*Assistant Examiner* — Courtney D Fields
(74) *Attorney, Agent, or Firm* — Robert D. Shedd; Joseph J. Opalach; Jerome G. Schafer

(57) ABSTRACT

Techniques for protecting the security of digital representations and of analog forms made from them, including a technique for authenticating an analog form produced from the digital representation, an active watermark that contains program code that may be executed when the watermark is read, and a watermark agent that reads watermarks and sends messages with information concerning the digital representations that contain the watermarks. A watermark agent may be a permanent resident of a node in a network or of a device or it may move from one network node to another. The watermark agent executes code which examines digital representations residing in the node or device for watermarked digital representations that are of interest to the watermark agent. The watermark agent then sends messages which report the results of its examination of the digital representations. If the watermarks are active, the agent and the active watermark may cooperate.

25 Claims, 12 Drawing Sheets

U.S. PATENT DOCUMENTS

| | | | |
|---|---|---|---|
| 5,745,569 A | 4/1998 | Moskowitz et al. | |
| 5,778,102 A | 7/1998 | Sandford et al. | |
| 5,822,432 A | 10/1998 | Moskowitz et al. | |
| 5,832,119 A | 11/1998 | Rhoads | |
| 5,841,978 A | 11/1998 | Rhoads | |
| 5,862,260 A | 1/1999 | Rhoads | |
| 6,345,104 B1 | 2/2002 | Rhoads | |
| 6,735,699 B1 * | 5/2004 | Sasaki et al. | 726/28 |
| 7,024,016 B2 | 4/2006 | Rhoads et al. | |
| 7,236,610 B1 * | 6/2007 | Luo et al. | 726/26 |

FOREIGN PATENT DOCUMENTS

| | | | |
|---|---|---|---|
| WO | WO 2004055808 A1 * | 7/2004 | |

OTHER PUBLICATIONS

Title: Digimarc Watermarking Guide, Copyright 1997 Digimarc Corporation, pp. 1-17, Portland, Oregon 97205.

MarcSpider Service, Corporate Complete Package, www.-digimarc.com/corp_com, 2 pages, 1997-1998, Digimarc Corporation.

About Digital Watermarks, www.digimarc.com Products and Technology, 1997 Digimarc Corporation.

Press Releases, www.digimarc.com, Digimarc Awarded Patent on Basic Technology for Locating and Reading Digital Watermarks, Mar. 9, 1998.

Patent Server, 5636292: Steganography methods employing embedded calibration data, www./patents.ibm.com/claims7patent.

* cited by examiner

```
DatagramSocket s = new DatagramSocket (0); ─╱─703

InetAddress a =                705
    netAdress.getByName("syscop.crcg.edu");─╱─709

DatagramPacket p = new DatagramPacket("XYZ
    Displayed", 13, a, 14); ╲─1715 s.send(p); 1711            1713
     ╲
     1719
```

| P, 1101 | Sensitivity, 1103 | |
|---|---|---|
| AL, 1105 | | |
| AP, 1107 | | |
| UD, 1109 | | |

```
// Instantiate a file filter.
FileFilter fileFilter =new FileFilter();            /* 1205 */
// filter out all image files from the file system.
String [] filenames = fileFilter.filterImages();    // 1207
// get host environment information.
EnvInfo env = getEnvInfo();                         // 1209
// construct a new vector used to store action results.
Vector results = new Vector();                      // 1211 for(int i=0; i<filenames.length; i++) {
  // check each image file for watermark.
  String watermark = checkWatermark(filenames[i];   // 1215
  if (watermark != null) { // if a watermark is found // match the watermark with the host environment.
      String match = matchEnv(watermark, env) ;     // 1219
      // take action according to the matching result.
      String result = takeAction(match);            // 1221
      // add the result to the vector.
      results.addElement(result);                   // 1223
  }
}
return results;
              1225
1201
```

Fig. 12

ACTIVE WATERMARKS AND WATERMARK AGENTS

CROSS-REFERENCE TO RELATED APPLICATIONS

This application is a continuing application of U.S. Ser. No. 10/872,877, filed on Jun. 21, 2004 now abandoned which has the same title, inventor, ans assignee as the present application. U.S. Ser. No. 10/872,877 is under final rejection. U.S. Ser. No. 10/872,877 is a divisional of application Ser. No. 09/070,597 filed on Apr. 30, 1998, now U.S. Pat. No. 6,754,822, which has the same inventor, title, and assignee as the present application. U.S. Pat. No. 6,754,852 and U.S. Ser. No. 10/872,877 are hereby both incorporated by reference into the present patent application for all purposes. The present application contains amended versions of the claims from Ser. No. 10/872,877 under final rejection and additional claims to subject matter which is patentably distinct from the claims under rejection. U.S. Pat. No. 6,754,852 further has the same Detailed Description as U.S. Pat. No. 6,243,480, Jian Zhao and E. Koch, Digital Authentication with Analog Documents, assigned to Mediasec LLP and filed on even date with U.S. Pat. No. 6,754,822.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates generally to digital representations of images and other information and more specifically to techniques for protecting the security of digital representations and of analog forms produced from them.

2. Description of the Prior Art Nowadays, the easiest way to work with pictures or sounds is often to make digital representations of them. Once the digital representation is made, anyone with a computer can copy the digital representation without degradation, can manipulate it, and can send it virtually instantaneously to anywhere in the world. The Internet, finally, has made it possible for anyone to distribute any digital representation from anywhere in the world From the point of view of the owners of the digital representations, there is one problem with all of this: pirates, too, have computers, and they can use them to copy, manipulate, and distribute digital representations as easily as the legitimate owners and users can. If the owners of the original digital representations are to be properly compensated for making or publishing them, the digital representations must be protected from pirates. There are a number of different approaches that can be used:

the digital representation may be rendered unreadable except by its intended recipients; this is done with encryption techniques;

digital signatures;

the digital representation may contain information from which it may be determined whether it has been tampered with in transit; this information is termed a digest and the digital signature often includes a digest;

the digital representation may contain a watermark, an invisible indication of ownership which cannot be removed from the digital representation and may even be detected in an analog copy made from the digital representation, and the above techniques can be employed in systems that not only protect the digital representations, but also meter their use and/or detect illegal use.

For an example of a system that uses encryption to protect digital representations, see U.S. Pat. No. 5,646,999, Saito, Data Copyright Management Method, issued Jul. 8, 1997, for a general discussion of digital watermarking, see Jian Zhao, "Look, It's Not There", in: BYTE Magazine, January, 1997. Detailed discussions of particular techniques for digital watermarking may be found in E. Koch and J. Zhao, "Towards Robust and Hidden Image Copyright Labeling", in: Proc. Of 1995 IEEE Workshop on Nonlinear Signal and Image Processing, Jun. 20-22, 1995, and in U.S. Pat. No. 5,710,834, Rhoads, Method and Apparatus Responsive to a Code Signal Conveyed through a Graphic Image, issued Jan. 20, 1998. For an example of a commercial watermarking system that uses the digital watermarking techniques disclosed in the Rhoads patent, see Digimarc Watermarking Guide, Digimarc Corporation, 1997, available at in March, 1998 at http://www.digimarc.com.

FIG. 1 shows a prior-art system 101 which employs the above protection techniques. A number of digital representation clients 105, of which only one, digital representation client 105(j) is shown, are connected via a network 103 such as the Internet to a digital representation server 129 which receives digital representations from clients 105 and distributes them to clients 105. Server 129 includes a data storage device 133 which contains copied digital representations 135 for distribution and a management data base 139. Server 129 further includes a program for managing the digital representations 135, a program for reading and writing watermarks 109, a program for authenticating a digital representation and confirming that a digital representation is authentic 111, and a program for encrypting and decrypting digital representations 113. Programs 109, 111, and 113 together make up security programs 107.

Client 105 has its own versions of security programs 107; it further has editor/viewer program 115 which lets the user of client 105 edit and/or view digital representations that it receives via network 103 or that are stored in storage device 1.17. Storage device 117 as shown contains an original digital representation 119 which was made by a user of client 105 and a copied digital representation 121 that was received from DR Server 129. Of course, the user may have made original representation 119 by modifying a copied digital representation. Editor/viewer program 115, finally, permits the user to output digital representations to analog output devices 123. Included among these devices are a display 123, upon which an analog image 124 made from a digital representation may be displayed and a printer 127 upon which an analog image 126 made from the digital representation may be printed. A loudspeaker may also be included in analog output devices 123. The output of the analog output device will be termed herein an analog form of the digital representation. For example, if the output device is a printer, the analog form is printed sheet 126, if it is a display device, it is display 124.

When client 105(j) wishes to receive a digital representation from server 129, it sends a message requesting the digital representation to server 129. The message includes at least an identification of the desired digital representation and an identification of the user. Manager 131 responds to the request by locating the digital representation in CDRs 135, consulting management data base 139 to determine the conditions under which the digital representation may be distributed and the status of the user of client 105 as a customer. If the information in data base 139 indicates to manager 131 that the transaction should go forward, manager 131 sends client 105(j) a copy of the selected digital representation. In the course of sending the copy, manager 131 may use watermark reader/writer 109 to add a watermark to the digital representation, use authenticator/confirmer 111 to add authentication information, and encrypter/decrypter 113 to encrypt the digital representation in such a fashion that it can only be decrypted in DR client 105(j).

When client 105(j) receives the digital representation, it decrypts it using program 113, confirms that the digital representation is authentic using program 111, and editor/viewer 115 may use program 109 to display the watermark. The user of client 105(}) may save the encrypted or unencrypted digital representation in storage 0.117. The user of client 105(j) may finally employ editor/viewer 115 to decode the digital representation and output the results of the decoding to an analog output device 123. Analog output device 123 may be a display device 125, a printer 127, or in the case of digital representations of audio, a loudspeaker.

It should be pointed out that when the digital representation is displayed or printed in analog form, the only remaining protection against copying is watermark 128, which cannot be perceived in the analog form by the human observer, but which can be detected by scanning the analog form and using a computer to find watermark 128. Watermark 128 thus provides a backup to encryption: if a digital representation is pirated, either because someone has broken the encryption, or more likely because someone with legitimate access to the digital representation has made illegitimate copies, the watermark at least makes it possible to determine the owner of the original digital representation and given that evidence, to pursue the pirate for copyright infringement and/or violation of a confidentiality agreement. If the user of client 105(j) wishes to send an original digital representation 119 to DR server 129 for distribution, editor/viewer 115 will send digital representation 119 to server 129. In so doing, editor/viewer 115 may use security programs 107 to watermark the digital representation, authenticate it, and encrypt it so that it can be decrypted only by DR Server 129. Manager 131 in DR server 129 will, when it receives digital representation 119, use security programs 107 to decrypt digital representation 119, confirm its authenticity, enter information about it in management data base 139, and store it in storage 133. In the case of the Digimarc system referred to above, manager 131 also includes a World Wide Web spider, that is, a program that systematically follows World Wide Web links such as HTTP and FTP links and fetches the material pointed to by the links.

Manager program 131 uses watermark reading/writing program to read any watermark, and if the watermark is known to management database 139, manager program 131 takes whatever action may be required, for example, determining whether the site from which the digital representation was obtained has the right to have it, and if not, notifying the owner of the digital representation.

While encryption, authentication, and watermarking have made it much easier for owners of digital representations to protect their property, problems still remain. One such problem is that the techniques presently used to authenticate digital documents do not work with analog forms; consequently, when the digital representation is output in analog form, the authentication is lost. Another is that present-day systems for managing digital representations are not flexible enough. A third is that watermark checking such as that done by the watermark spider described above is limited to digital representations available on the Internet. It is an object of the present invention to overcome the above problems and thereby to provide improved techniques for distributing digital representations.

BRIEF SUMMARY OF THE INVENTION

The object of the present invention is attained by a watermark agent which is located in a device upon which digital representations containing watermarks are resident. The watermark agent reads the watermark in a digital representation and performs actions ranging from sending a message to the user through sending a message to a monitoring agent, moving the digital representation, or changing its access rights to destroying the digital representation. Some watermark agents are mobile. A mobile watermark agent moves from node to node in a network. In each node, it examines the watermarks on digital representations stored in the node and sends messages reporting its findings to a monitoring agent located in the network. When a watermark agent encounters a digital representation with an active watermark, the watermark agent may execute the program code contained in the active watermark.

Other objects and advantages of the invention will be apparent to those skilled in the arts to which the invention pertains upon perusing the following Detailed Description and Drawing, wherein:

BRIEF DESCRIPTION OF THE SEVERAL VIEWS OF THE DRAWINGS

FIG. 7 is an example of code from an active watermark;

FIG. 11 is a detailed diagram of access information 603; and

FIG. 12 is an example of code executed by a watermark agent.

Figure 1:
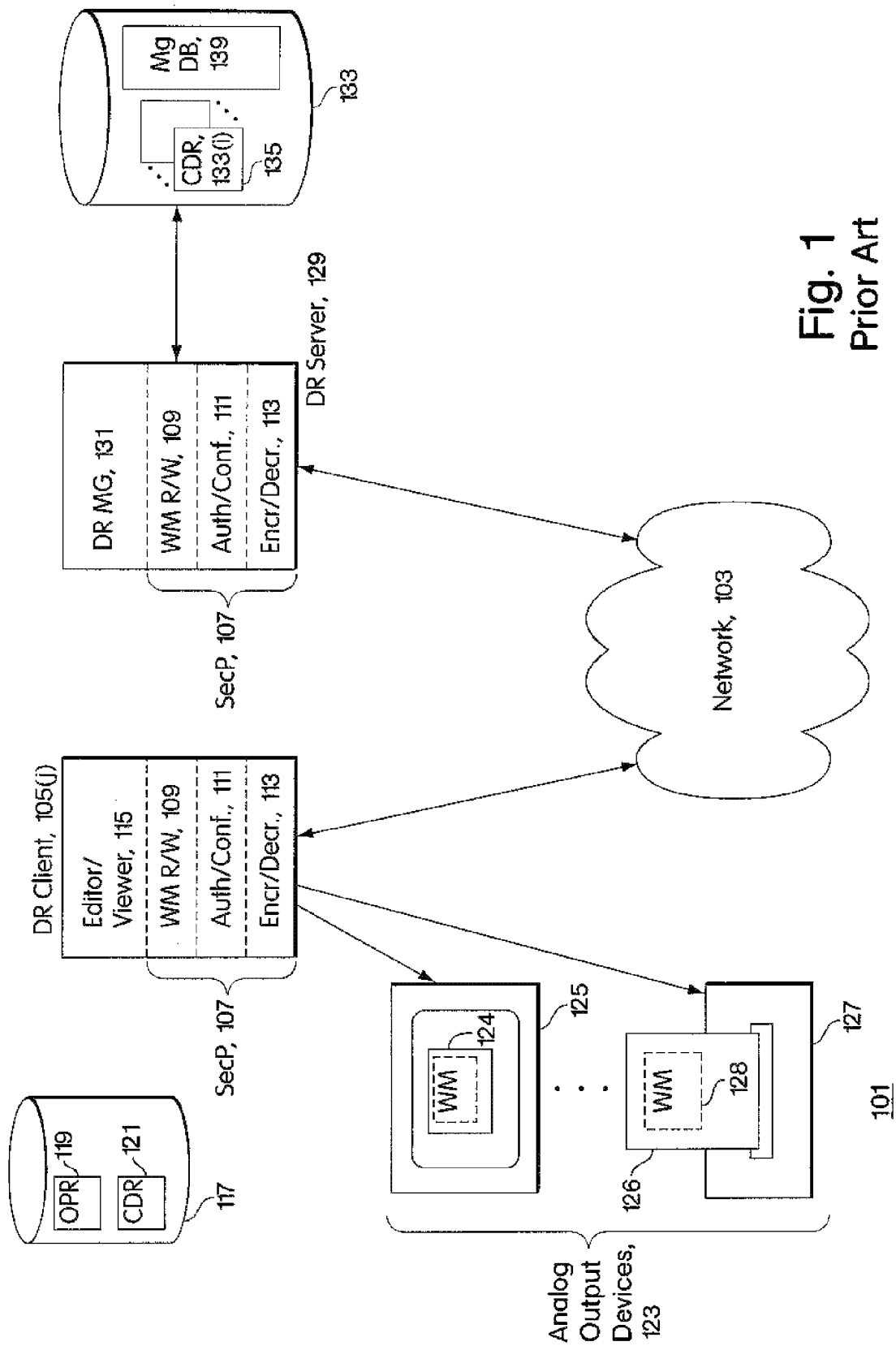
FIG. 1 is a block diagram of a prior-art system for securely distributing digital representations.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION OF THE INVENTION

The following Detailed Description will first disclose a technique for authenticating digital representations that survives output of an analog form of the digital representation, will then disclose active watermarks, that is, watermarks that contain programs, and will finally disclose watermark agents, that is, programs which examine the digital watermarks on digital representations stored in a system and thereby locate digital representations that are being used improperly.

Authentication that is Preserved in Analog Forms: FIGS. 2-5

Digital representations are authenticated to make sure that they have not been altered in transit. Alteration can occur as a result of transmission errors that occur during the course of transmission from the source of the digital representation to its destination, as a result of errors that arise due to damage to the storage device being used to transport the digital representation, as a result of errors that arise in the course of writing the digital representation to the storage device or reading the digital representation from the storage device, or as a result of human intervention. A standard technique for authentication is to make a digest of the digital representation and send the digest to the destination together with the digital representation. At the destination, another digest is made from the digital representation as received and compared with the first. If they are the same, the digital representation has not changed. The digest is simply a value which is much shorter than the digital representation but is related to it such that any change in the digital representation will with very high probability result in a change to the digest.

Where human intervention is a serious concern, the digest is made using a one-way hash function, that is, a function that produces a digest from which it is extremely difficult or impossible to learn anything about the input that produced it. The digest may additionally be encrypted so that only the recipient of the digital representation can read it. A common technique is to use the encrypted digest as the digital signature for the digital representation, that is, not only to show that the digital representation has not been altered in transit, but also to show that it is from whom it purports to be from. If the sender and the recipient have exchanged public keys, the sender can make the digital signature by encrypting the digest with the sender's private key. The recipient can use the sender's public key to decrypt the digest, and having done that, the recipient compares the digest with the digest made from the received digital representation. If they are not the same, either the digital representation has been altered or the digital representation is not from the person to whom the public key used to decrypt the digest belongs. For details on authentication, see Section 3.2 of Bruce Schneier, *Applied Cryptography*, John Wiley and Sons, 1994.

The only problem with authentication is that it is based entirely on the digital representation. The information used to make the digest is lost when the digital representation is output in analog form. For example, if the digital representation is a document, there is no way of determining from a paper copy made from the digital representation whether the digital representation from which the paper copy was made is authentic or whether the paper copy is itself a true copy of the digital representation.

While digital watermarks survive and remain detectable when a digital representation is output in analog form, the authentication problem cannot be solved simply by embedding the digest or digital signature in the watermark. There are two reasons for this:

Watermarking changes the digital representation; consequently, if a digital representation is watermarked after the original digest is made, the watermarking invalidates the original digest, i.e., it is no longer comparable with the new digest that the recipient makes from the watermarked document.

More troublesome still, when a digital representation is output in analog form, so much information about the digital representation is lost that the digital representation cannot be reconstructed from the analog form. Thus, even if the original digest is still valid, there is no way of producing a comparable new digest from the analog form What is needed to overcome these problems is an authentication technique which uses information for authentication which is independent of the particular form of the digital representation and which will be included in the analog form when the analog form is output. As will be explained in more detail in the following, the first requirement is met by selecting semantic information from the digital representation and using only the semantic information to make the digest. The second requirement is met by incorporating the digest into the digital representation in a fashion such that it on the one hand does not affect the semantic information used to make the digest and on the other hand survives in the analog form. In the case of documents, an authentication technique which meets these requirements can be used not only to authenticate analog forms of documents that exist primarily in digital form, but also to authenticate documents that exist primarily or only in analog form, for example paper checks and identification cards.

Semantic Information

The semantic information in a digital representation is that portion of the information in the digital representation that must be present in the analog form made from the digital representation if the human who perceive the analog form is to consider it a copy of the original from which the digital representation was made. For example, the semantic information in a digital representation of an image of a document is the representations of the alphanumeric characters in the document, where alphanumeric is understood to include representations of any kind of written characters or punctuation marks, including those belonging to non-Latin alphabets, to syllabic writing systems, and to ideographic writing systems. Given the alphanumeric characters, the human recipient of the analog form can determine whether a document is a copy of the original, even though the characters may have different fonts and may have been formatted differently in the original document. There is analogous semantic information in digital representations of pictures and of audio information. In the case of pictures, it is the information that is required for the human that perceives the analog form to agree that the analog form is a copy (albeit a bad one) of the original picture, and the same is the case with audio information.

In the case of a document written in English, the semantic information in the document is the letters and punctuation of the document. If the document is in digital form, it may be represented either as a digital image or in a text representation language such as those used for word processing or printing. In the first case, optical character recognition (OCR) technology may be applied to the image to obtain the letters and punctuation; in the second case, the digital representation may be parsed for the codes that are used to represent the letters and punctuation in the text representation language. If the document is in analog form, it may be scanned to produce a digital image and the OCR technology applied to the digital image produced by scanning.

Figure 2:
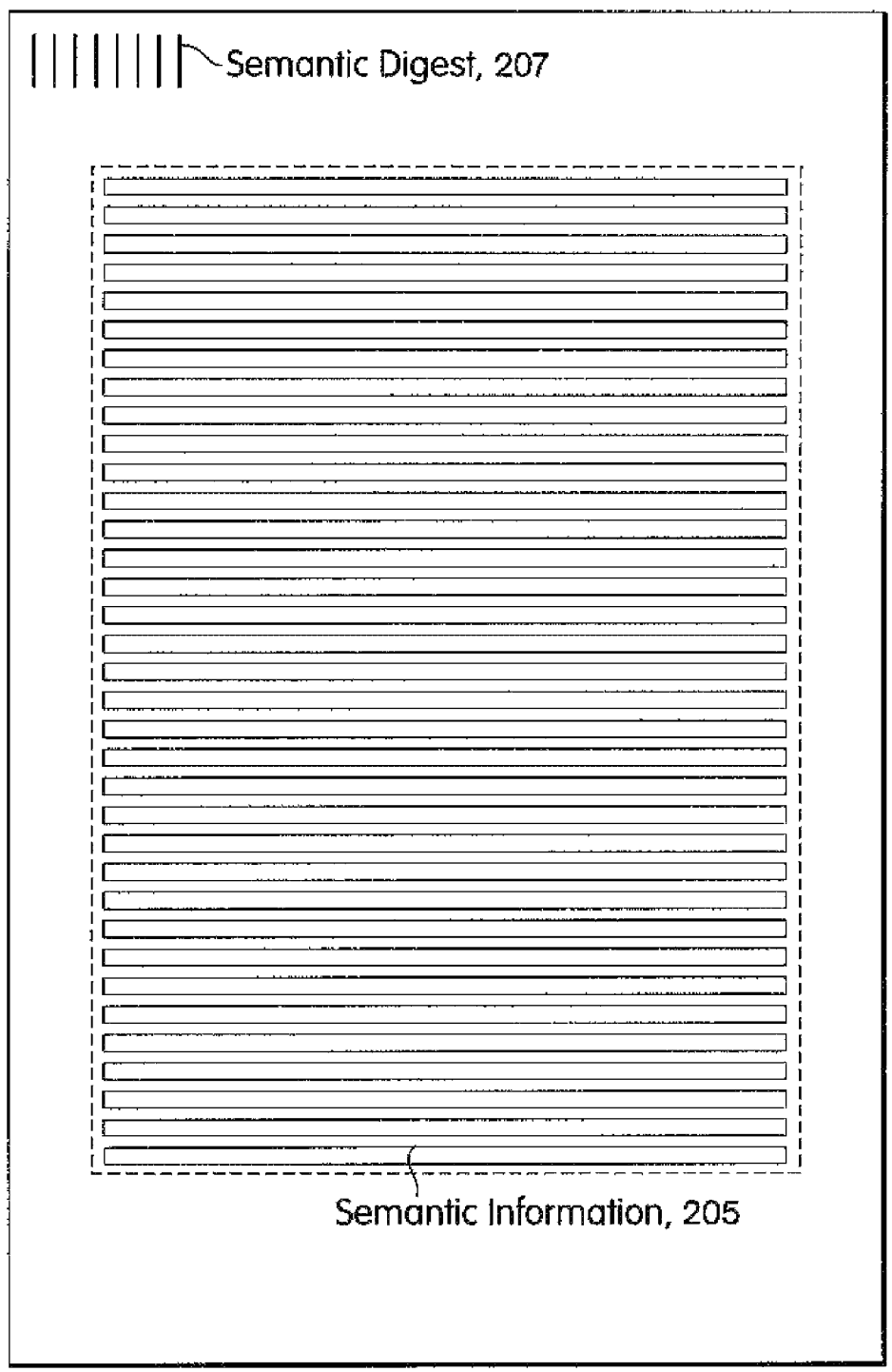
FIG. 2 is a diagram of a first embodiment of an analog form that can be authenticated.
Figure 3:
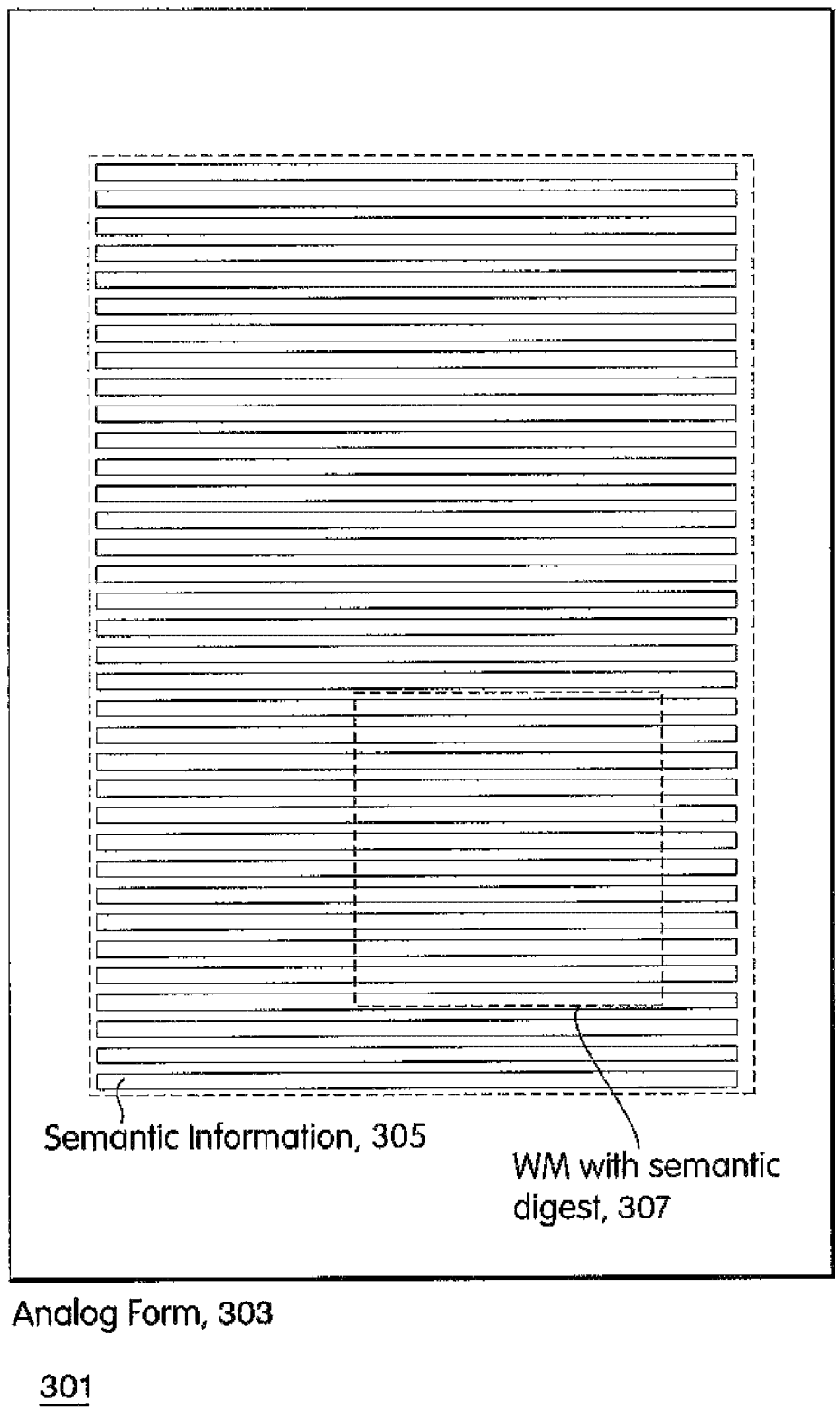
FIG. 3 is a diagram of a second embodiment of an analog form that can be authenticated.

Using Semantic Information to Authenticate an Analog Form: FIGS. 2 and 3

Because the semantic information must be present in the analog form, it may be read from the analog form and used to compute a new digest. If the old digest was similarly made from the semantic information in the digital representation and the old digest is readable from the analog form, the new digest and the old digest can be compared as described in the discussion of authentication above to determine the authenticity of the analog form.

FIG. 2 shows one technique 201 for incorporating the old digest into an analog form 203. Analog form 203 of course includes semantic information 205; here, analog form 203 is a printed or faxed document and semantic information 205 is part or all of the alphanumeric characters on analog form 203. Sometime before analog form 203 was produced, semantic information 205 in the digital representation from which analog form 203 was produced was used to make semantic digest 207, which was incorporated into analog form 203 at a location which did not contain semantic information 205 when analog form 203 was printed. In some embodiments, semantic digest 207 may be added to the original digital representation, in others, it may be added just prior to production of the analog form. Any representation of semantic digest 207 which is detectable from analog form 203 may be employed; in technique 201, semantic digest 207 is a visible bar code. Of course, semantic digest 207 may include additional information; for example, it may be encrypted as described above and semantic digest 207 may include an identifier for the user whose public key is required to decrypt semantic digest 207. In such a case, semantic digest 207 is a digital signature that persists in the analog form.

With watermarking, the semantic digest can be invisibly added to the analog form. This is shown in FIG. 3. In technique 301, analog form 303 again includes semantic information 305. Prior to producing analog form 303, the semantic information in the digital representation from which analog form 303 is produced is used as described above to produce semantic digest 207; this time, however, semantic digest 207 is incorporated into watermark 307, which is added to the digital representation before the analog form is produced from the digital representation and which, like the bar code of FIG. 2, survives production of the analog form. A watermark reader can read watermark 307 from a digital image made by scanning analog form 303, and can thereby recover semantic digest 207 from watermark 307. As was the case with the visible semantic digest, the semantic digest in watermark 307 may be encrypted and may also function as a digital signature.

Figure 4:
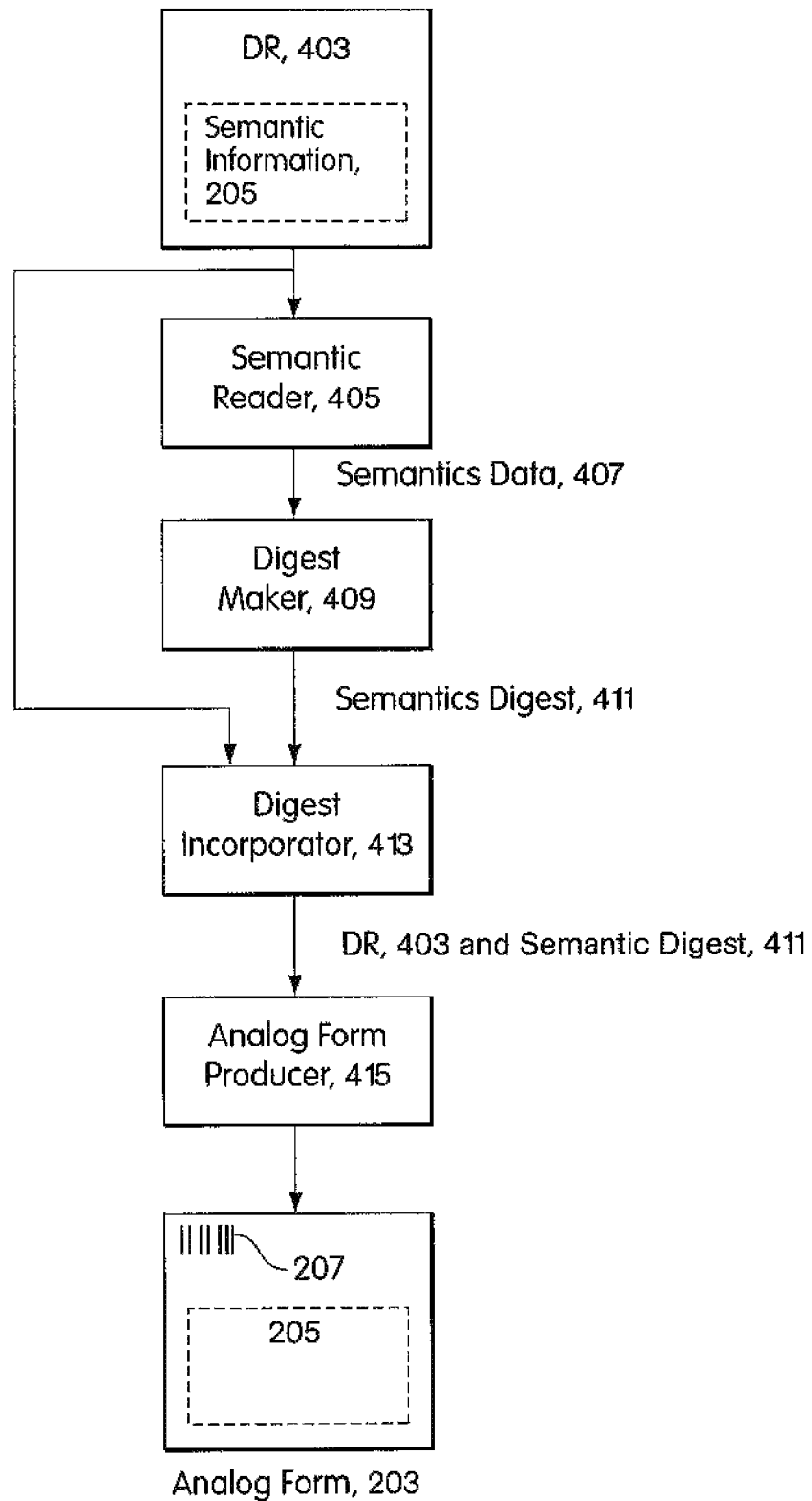
FIG. 4 is a diagram of a system for adding authentication information to an analog form.

FIG. 4 shows a system 401 for adding a semantic digest to an analog form 203. The process begins with digital representation 403, whose contents include semantic information 205. Digital representation 403 is received by semantics reader 405, which reads semantic information 205 from digital representation 403. Semantics reader 405's operation will depend on the form of the semantic information. For example, if digital representation 403 represents a document, the form of the semantic information will depend on how the document is represented. If it is represented as a bit-map image, the semantic information will be images of alphanumeric characters in the bit map; if it is represented using one of the many representations of documents that express alphanumeric characters as codes, the semantic information will be the codes for the alphanumeric characters. In the first case, semantics reader 405 will be an optical character reading (OCR) device; in the second, it will simply parse the document representation looking for character codes.

Figure 5:
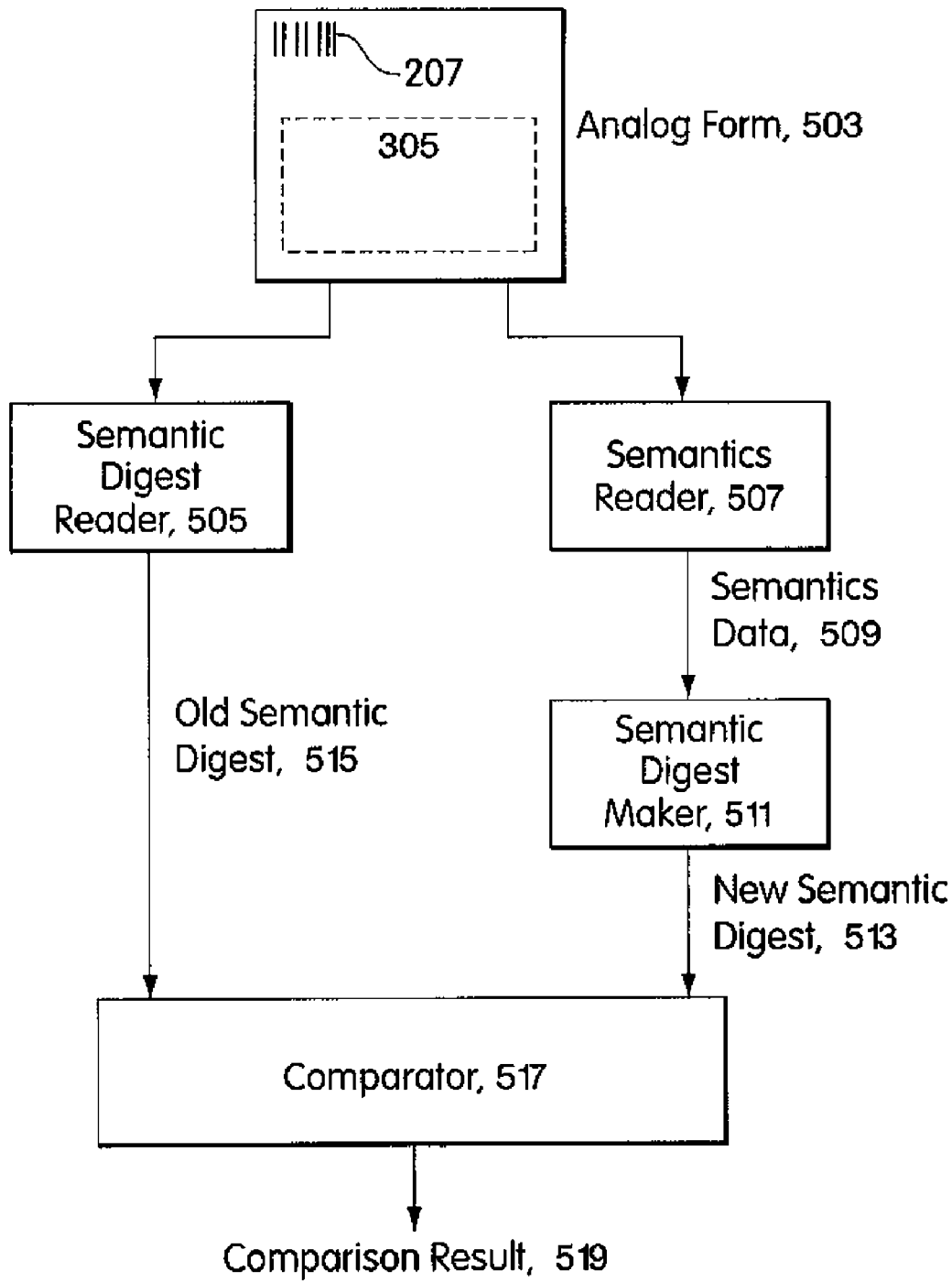
FIG. 5 is a diagram of a system for authenticating an analog form.

In any case, at the end of the process, semantics reader 405 will have extracted some form of semantic information, for example the ASCII codes corresponding to the alphanumeric characters, from representation 403. This digital information is then provided to digest maker 409, which uses it to make semantic digest 411 in any of many known ways. Depending on the kind of document the semantic digest is made from and its intended use, the semantic digest may have a form which requires an exact match with the new digest or may have a form which permits a "fuzzy" match. Digital representation 403 and semantic digest 411 are then provided to digest incorporator 413, which incorporates a representation 207 of digest 411 into the digital representation used to produce analog form 203. As indicated above, the representation must be incorporated in such a way that it does not affect semantic information 205. Incorporator 413 then outputs the representation it produces to analog form producer 415, which produces analog form 203 in the usual fashion. Analog form 203 of course includes semantic information 205 and representation 207 of semantic digest 411. Here, the bar code is used, but representation 207 could equally be part of a watermark, as in analog form 303. Components 405, 409, and 413 may be implemented as programs executed on a digital computer system; analog form producer 415 may be any device which can output an analog form Authenticating an Analog Form that has a Semantic Digest FIG. 5 shows a system 501 for authenticating an analog form 503 that has a semantic digest 207. Analog form 503 is first provided to semantic digest reader 505 and to semantics reader 505. Semantic digest reader 505 reads semantic digest 207; if semantic digest 207 is a bar code, semantic digest reader 505 is a bar code reader; if semantic digest 207 is included in a digital watermark, semantic digest reader 505 is a digital watermark reader which receives its input from a scanner. If semantic digest 505 must be decrypted, semantic digest reader 505 will do that as well. In some cases, that may require sending the encrypted semantic digest to a remote location that has the proper key.

Semantics reader 507 reads semantic information 305. If analog form 503 is a document, semantics reader 507 is a scanner which provides its output to OCR software. With other images, the scanner provides its output to whatever image analysis software is required to analyze the features of the image that make up semantic information 305. If analog form 503 is audio, the audio will be input to audio analysis software. Once the semantics information has been reduced to semantics data 509, it is provided to semantic digest maker 511, which makes a new semantic digest 513 out of the information. To do so, it uses the same technique that was used to make old semantic digest 515. Comparator 517 then compares old semantic digest 515 with new semantic digest 513, if the digests match, comparison result 519 indicates that analog form 203 is authentic; if they do not, result 519 indicates that they are not authentic. What "match" means in this context will be explained in more detail below.

"Matching" Semantic Digests

With the digests that are normally used to authenticate digital representations, exact matches between the old and new digests are required. One reason for this is that in most digital contexts, "approximately correct" data is useless; another is that the one-way hashes normally used for digests are "cryptographic", that is, the value of the digest reveals nothing about the value from which it was made by the hash function, or in more practical terms, a change of a single bit in the digital representation may result in a large change in the value produced by the hash function. Since that is the case, the only comparison that can be made between digests is one of equality.

In the context of authenticating analog forms, the requirement that digests be equal causes difficulties. The reason for this is that reading semantic information from an analog form is an error-prone operation. For example, after many years of effort, OCR technology has gotten to the point where it can in general recognize characters with 98% accuracy when it begins with a clean copy of a document that is simply formatted and uses a reasonable type font. Such an error rate is perfectly adequate for many purposes; but for semantic information of any size, a new digest will almost never be equal to the old digest when the new digest is made from semantics data that is 98% the same as the semantics data that was used to make the old semantic digest. On the other hand, if the semantics data obtained from the analog form is 98% the same as the semantics data obtained from the digital representation, there is a very high probability that the analog form is in fact an authentic copy of the digital representation.

Precise Matches

Of course, if the semantic information is limited in size and tightly constrained, it may be possible to require that the digests be exactly equal. For example, many errors can be eliminated if what is being read is specific fields, for example in a check or identification card, and the OCR equipment is programmed to take the nature of the field's contents into account. For example, if a field contains only numeric characters, the OCR equipment can be programmed to treat the letters o and 0 as the number 0 and the letters 1, i, or I as the number 1. Moreover, if a match fails and the semantic information contains a character that is easily confused by the OCR equipment, the character may be replaced by one of the characters with which it is confused, the digest may be recomputed, and the match may again be attempted with the recomputed digest.

Fuzzy Matches

Where the semantic information is not tightly constrained, the digests must be made in such a fashion that closely-similar semantic information produces closely-similar digests. When that is the case, matching becomes a matter of determining whether the difference between the digests is within a threshold value, not of determining whether they are equal. A paper by Marc Schneider and Shih-Fu Chang, "A Robust Content Based Digital Signature for Image Authentication", in: *Proceedings of the* 1996 *International Conference on Image Processing*, presents some techniques for dealing with related difficulties in the area of digital imaging. There, the problems are not caused by loss of information when a digital representation is used to make an analog form and by mistakes made in reading analog forms, but rather by "lossy" compression of images, that is, compression using techniques which result in the loss of information. Because the lost information is missing from the compressed digital representation, a digest made using cryptographic techniques from the compressed digital representation will not be equal to one made from the digital representation prior to compression, even though the compressed and uncompressed representations contain the same semantic information. Speaking generally, the techniques presented in the Schneider paper deal with this problem by calculating the digest value from characteristics of the image that are not affected by compression, such as the spatial location of its features. Where there are sequences of images, the digest value is calculated using the order of the images in the sequences.

Analogous approaches may be used to compute the semantic digest used to authenticate an analog form. For example, a semantic digest for a document can be computed like this:
1. Set the current length of a digest string that will hold the semantic digest to "0";
2. Starting with the first alphanumeric character in the document, perform the following steps until there are no more characters in the document:
   a. Select a next group of characters,
   b. For the selected group,
      i. replace characters in the group such as O, 0, o; I, i, 1, l; or c, e that cause large numbers of OCR errors with a "don't care" character;
      ii. make a hash value from the characters in the group,
      iii. append the hash value to the semantic digest string;
   c. return to step (a).
3. When there are no more characters in the document, make the semantic digest from the digest string.

When computed in this fashion, the sequence of values in the semantic digest string reflects the order of the characters in each of the sequences used to compute the digest. If the sequence of values in the new semantic digest that is computed from the analog form has a high percentage of matches with the sequence of values in the old semantic digest, there is a high probability that the documents contain the same semantic information.

Applications of Authentication with Analog Forms

One area of application is authenticating written documents generally. To the extent that the document is of any length and the digest is computed from a significant amount of the contents, the digest will have to be computed in a fashion which allows fuzzy matching. If the digest is computed from closely-constrained fields of the document, exact matching may be employed.

Another area of application is authenticating financial documents such as electronic cash, electronic checks, and bank cards. Here, the fields from which the digest is computed are tightly constrained and an exact match may be required for security. In all of these applications, the digest or even the semantic information itself would be encrypted as described above to produce a digital signature.

Digital cash is at present a purely electronic medium of payment. A given item of digital cash consists of a unique serial number and a digital signature. Authentication using semantic information permits digital cash to be printed as digital paper cash. The paper cash is printed from an electronic image which has a background image, a serial number, and a money amount. The serial number and the money amount are the semantic information. The serial number and the money amount are used to make a digital signature and the digital signature is embedded as an electronic watermark into the background image. The paper cash can be printed by any machine which needs to dispense money. Thus, an ATM can dispense digital paper cash instead of paper money. Similarly, a vending machine can make change with digital paper cash and a merchant can do the same. The digital paper cash can be used in the same way as paper money. When a merchant (or a vending machine) receives the digital paper cash in payment, he or she uses a special scanner (including OCR technology and a watermark reader) to detect the watermark (i.e. the serial number and money amount) from the printed image, and send them to the bank for verification in the same fashion as is presently done with credit cards.

Digital Checks

Digital checks can be made using the same techniques as are used for digital paper cash. The digital check includes a background image, an identifier for the bank account, an amount to be paid, and the name of the payer. The payer's private key is used to make a digital signature from at least the identification of the bank and the amount to be paid, and the digital signature is embedded as an electronic watermark in the background image. Writing a digital check is a three-step process: enter the amount, produce the digital signature from the bank account number and the amount using the payer's private key, and embed the digital signature into the background image. The bank verifies the check by detecting the watermark from the digital check, decrypting the digital signature with the payer's public key, and comparing the bank account number and the amount from the image with the bank account number and the amount on the face of the check. A digital check can be used in either electronic form or paper form. In the latter case, a scanner (including OCR technology and watermark reader) is needed to read the watermark from the paper check.

Authentication of Identification Cards

The techniques described above for authenticating digital paper cash or digital checks can be used with identification cards, including bankcards. The card number or other identification information appears on the face of the card, is encrypted into a digital signature, and is embedded as a digital watermark in the background image of the bankcard. The encryption can be done with the private key of the institution that issues the card. The merchant uses use a scanner to detect the digital signature (i.e. card number or other ID) from the card, and compare the signature with the authentication stored inside the card. This technique can of course be combined with conventional authentication techniques such as the holographic logo.

Figure 6:
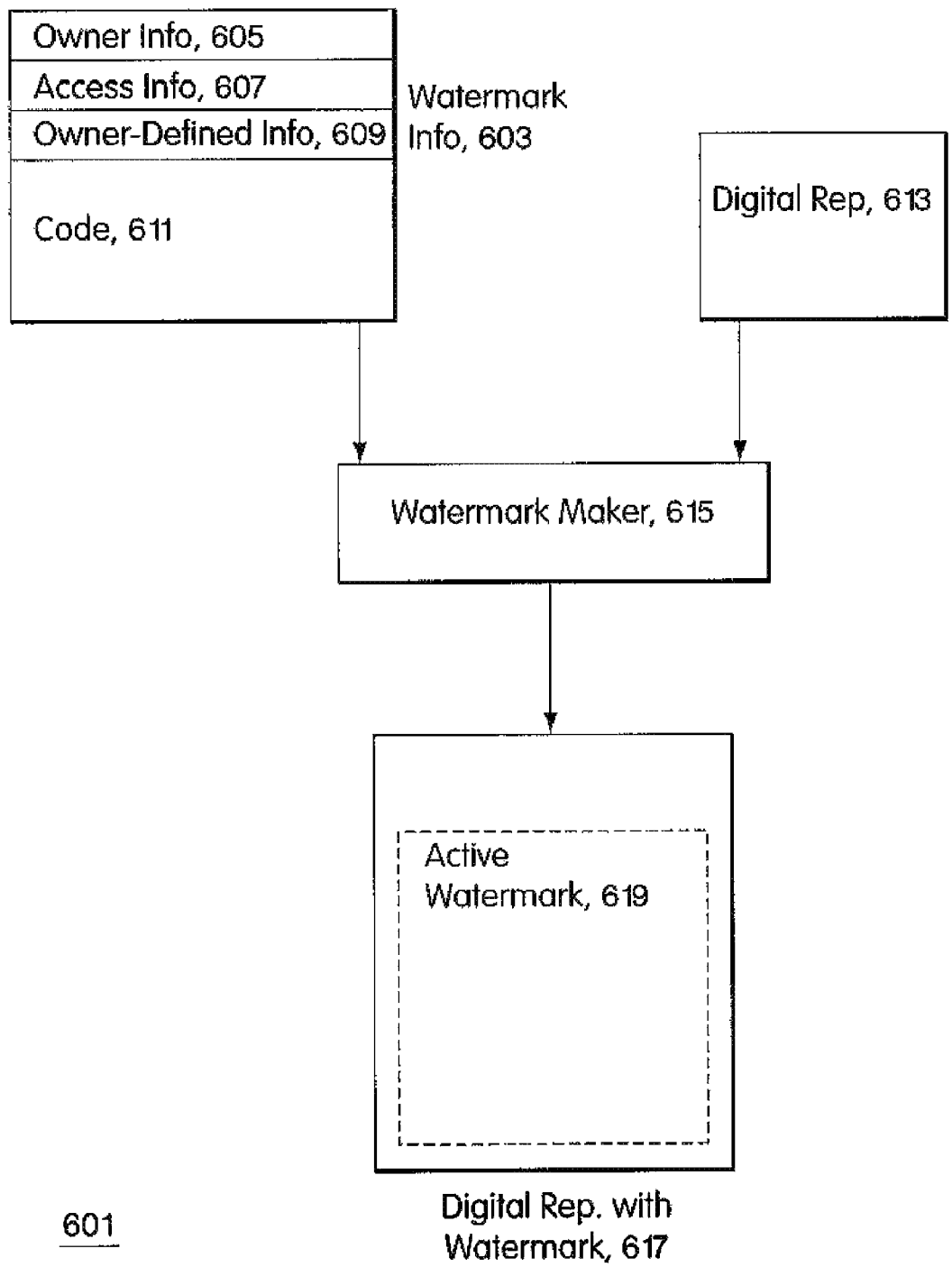
FIG. 6 is a diagram of a system for making an active watermark.
Figure 8:
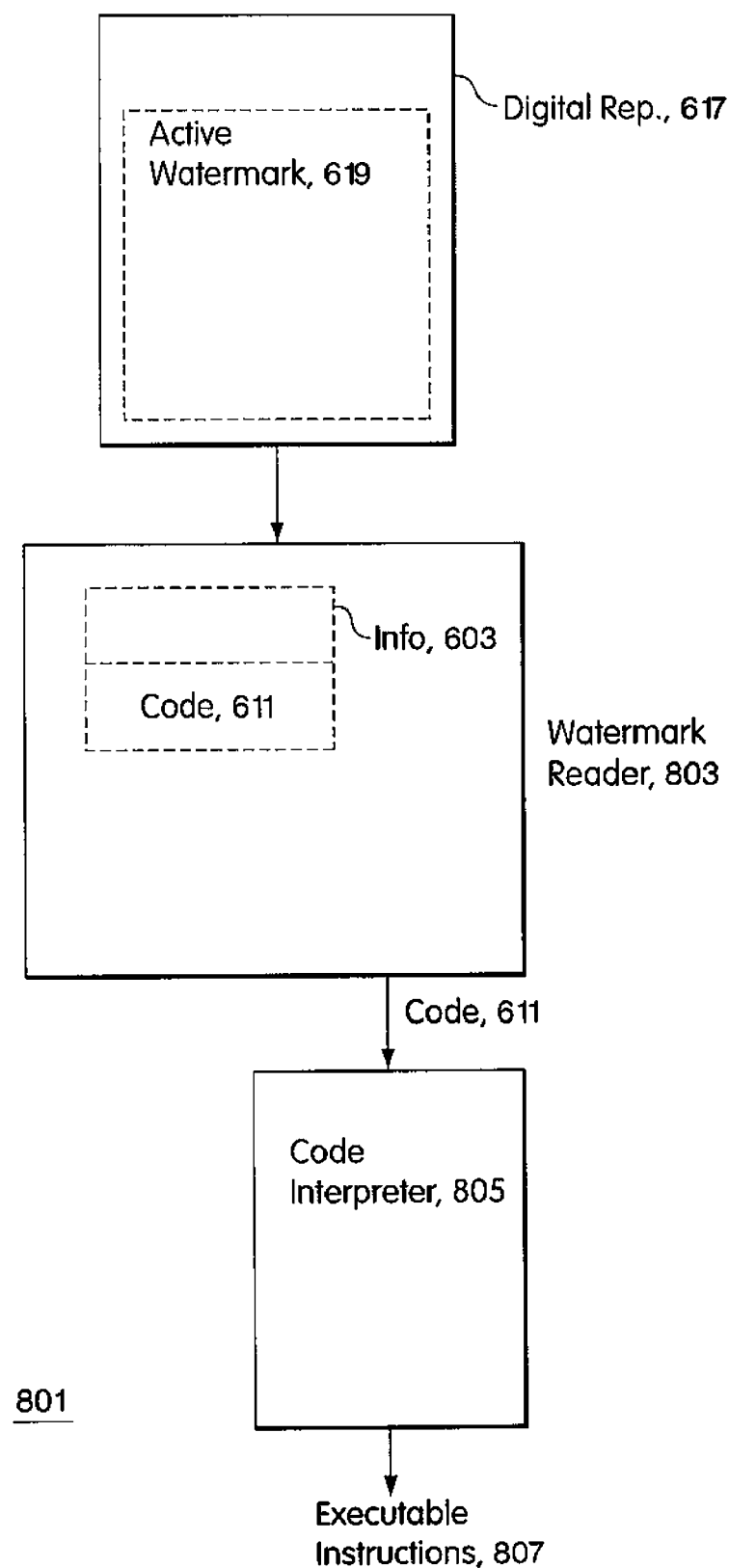
FIG. 8 is a diagram of a system for executing the code in an active watermark.

Active Watermarks: FIGS. 6-8

Heretofore, digital watermarks have been nothing more than labels. They have typically contained information such as identifiers for the owner and creator of the digital representation and access control information, for example, whether the digital representation may be copied or changed. Any kind of information can, however be placed in a digital watermark. If the information in the watermark describes an action to be taken, the watermark becomes active, and the digital representation that contains the active watermark becomes active as well. This is the reverse of the usual practice of encapsulating a digital representation in a program, as is done for example with Microsoft Active Documents. Since digital watermarks are used in digital systems, the simplest way to make a watermark active is to include program code in it which can be executed by the computer system upon which the digital representation is currently resident. From the point of view of function, the code may be in any language for which the computer system can execute code. Practically, however, the code is best written in a language such as Java™ or Perl for which most modern computer systems have interpreters.

FIG. 6 is an overview of a system 601 for making an active watermark 619. The watermark is made from watermark information 603, which contains owner information 605, access information 607, and owner-defined information 609 as before, but additionally contains code 611. Code 611 may be standard code for a given class of digital representations, or it may be defined specifically for a given digital representation. Code 611 may of course also use the other information in watermark information 603 as data. Watermark information 603 and digital representation 613 are input into watermark maker 615, which outputs digital representation 617, which is digital representation 613 modified to include watermark 619 made from watermark information 603. Since watermark information 603 includes code 611, watermark 619 is an active watermark.

FIG. 11 shows a preferred embodiment of access information 607. It includes fields as follows

- an 8-bit permission (P) field which indicates the kind of access the user may have: among the kinds are access which permits display, access which permits storing a local copy, and access which permits printing,
- a four-bit sensitivity field whose value indicates the degree of sensitivity of the contents of the digital representation,
- a 32-bit allowed location field which contains the IP address at which the digital representation is permitted to be located, and
- A 32-bit allowed period field which contains a period of time for which use of the digital representation has been permitted.

FIG. 7 is an example of a program which might be found in code 611. Program 701 is written in the Java programming language. It is then compiled into Java bytecodes which are interpreted by a Java interpreter. These bytecodes are included in the digital watermark. When program 701 is executed, a message indicating that digital representation 617 containing the active watermark has been displayed is sent via the Internet to a system that has been set up to monitor the display of digital representation 617, perhaps for the purpose of computing license fees. Line 703 of the code sets up a socket s by means of which a datagram may be sent to the monitoring system. Line 709 of the code finds the current Internet address of the monitoring system which is specified at 705 by the name syscop.crg.edu. Line 1715 makes a new datagram packet for the message; it includes the message content, XYZ Displayed and the internet address a. Line 1719, finally, uses the send operation associated with the socket s to send the message, which the Internet will deliver to the destination specified by a.

FIG. 8 shows a system 801 for executing the code in active watermark 619. Digital representation 617 containing active watermark 619 is input to watermark reader 803, which extracts watermark information 603 from active watermark 619. Info 603 includes code 611, which watermark reader 803 provides to code interpreter 805. Code interpreter 805 interprets code 611 to provide instructions which are executable by the computer system upon which code interpreter 805 is running. In some embodiments, code interpreter is an interpreter provided by the computer system for a standard language such as Java; in others, interpreter 805 may be provided as a component of watermark reader 803. In such embodiments, code 611 may be written in a language specifically designed for active watermarks.

An active watermark 619 can cause the computer system in which the active watermark is read to perform any action which can be described by the code contained in the active watermark. The only limitations are those imposed by the fact that the code is part of a watermark. One of these limitations is code size: code contained in a watermark must necessarily be relatively short; this limitation can be alleviated by compressing the code using a "non-lossy" compression technique, that is, one which does not result in the loss of information. Another of the limitations is that damage to the watermark may result in damage to the code; consequently, active watermarks may not work well in situations where the digital representation 617 is involved in "lossy" manipulations, i.e., manipulations that cause loss of information in digital representation 617. Examples of such lossy manipulations are editing the digital representation, lossy translation of the digital representation from one format into another, lossy compression of the digital representation, and producing a new digital representation from an analog form made from an old digital representation (as would be the case, for example, if the code were obtained by reading the watermark from a paper copy of a document).

Of course, techniques like those discussed above with reference to exact matches of digests can be applied to recover code from a damaged watermark or from an analog form, and to the extent that such techniques are successful, active watermarks can be used even where lossy manipulations have taken place. For example, the watermark of an analog form may contain not only authentication information, but also code. If a copy machine contained a watermark reader and an interpreter for the code used in the active watermark, the active watermark could be used, for instance, to prevent the copy machine from copying the analog form.

Among the things that can be done with active watermarks are the following:

Customizing the manner in which the digital representation containing the watermark is treated. Code 611 may differ for classes of digital representations, or may even be particular to a single digital representation;

Having a digital representation send a message whenever it is displayed, copied, printed, or edited; for example, whenever a document with an active watermark stored on a Web server is downloaded from the server, the active watermark can cause a message containing billing information to be sent to a billing server.

Having the digital representation obtain locally-available information, which will then govern the behavior and usage of the digital representation;

Having a digital representation take protective action when a user tries to do something with it that is not permitted by access information 603, the protective action can range from a warning through sending a message or blocking the intended action to destroying the digital representation that contains the watermark.

Watermark Agents

Digital representations pose special problems for their owners because, like all digital data, they can be easily copied and distributed across a network. These properties of digital data, however, also make it possible to automate monitoring of the distribution and use of watermarked digital representations. One way to do this is the watermark spider. As mentioned in the Description of the Prior Art, the watermark spider follows URLs to Web pages, which it retrieves and inspects for watermarks. If it finds one that is of interest, it reports its findings to a monitoring program. There are two problems with the watermark spider: the first is that it is limited to digital representations which are accessible by URLs that are available to the public. Thus, the watermark spider would not be able to locate a copy of a digital representation on a WWW client, as opposed to on a WWW server. The other problem is that the spider must fetch each digital representation to be examined across the network. Since digital representations are often large, the need to do this adds substantially to the volume of network traffic.

Both of these problems can be solved by means of a network watermark agent, that is, a watermark monitor which uses the network to move from system to system where digital representations of interest might be stored. At each system, the watermark agent examines the system's file system for digital representations that have watermarks of interest. If the watermark agent finds such a watermark, it may send a message with its findings via the network to a monitoring program. The watermark agent is thus able to monitor digital representations that are not available via public URLs and uses network bandwidth only relatively rarely and only to send messages that are small in comparison with digital representations. In the following, the creation of a watermark agent and its behavior in a system will both be explained in detail.

Figure 9:
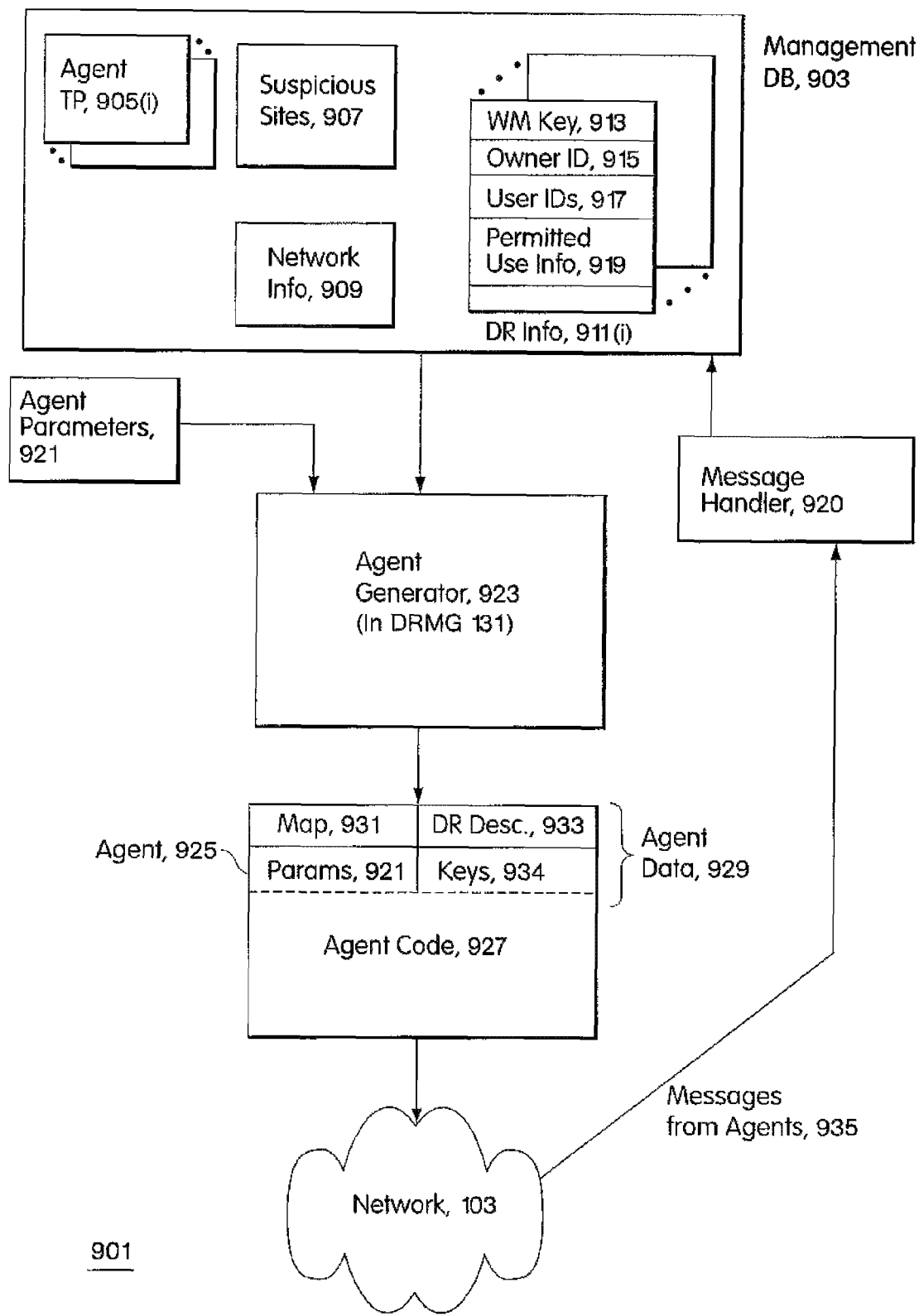
FIG. 9 is a diagram of a system for producing a watermark agent.

Creating a Watermark Agent: FIG. 9

FIG. 9 shows a watermark monitoring system 901 which creates and dispatches a watermark agent 925 across a network 103 and responds to messages from the watermark agent. Watermark agent 925 is a program which is able to send itself from one node to another in network 103. In each node, it searches for watermarked documents and sends messages 935 containing its findings to monitoring system 901, where message handler 920 deals with the message, often by adding information to management data base 903.

Continuing in more detail, agent 925 has two main parts: agent code 927, which is executed when agent 925 reaches a node, and agent data 929, which contains information used by agent 925 in executing the code and in moving to the next node. At a minimum, agent code 927 will include code which searches the node for files that may contain watermarks, code that makes and sends any necessary messages to monitoring system 901, code that clones agent 925, and code that sends the clone on to the next node. As with the code in active watermarks, code 927 may be written in any language which can be executed in a node, either standard languages such as Java or a specialized watermark agent language may be used.

FIG. 12 provides an example written in the Java language of code 1201 that a watermarking agent 925 might execute. Code 1201 searches the file system of the network node at which agent 925 is presently located for images files, checks each image file for a watermark, if it finds a watermark, it performs the action required by the watermark and the node, and makes a message containing a list of the actions it performed.

Continuing in more detail, code 1201 has two main sections, initialization 1203 and checking loop 1213. In initialization 1203, the first step is to instantiate a file filter to filter the files in the node's file system (1205). Then a function of the filter which locates image files is used to make a list filenames of the names of the image files in the file system (1207). Thereupon, information about the environment of the node that the agent needs to check watermarks is retrieved and placed in a variable env (1209); finally, a data structure called results is created to hold the results of the watermark checks 1211.

In loop 1213, each file in filenames is examined in turn for a watermark (1215); if one is found, the actions indicated at 1217 are performed, first, the contents of the watermark are compared with the environment information to obtain a result called match (1219). Then match is passed to a function which takes an action as determined by the value of match and returns a value result which represents the result of the action (1221), finally, result is added to the data structure results (1223). then, at 1225, results is returned. Depending on how the watermark agent is being used, results can then be sent in a message to monitoring system 901.

Continuing in more detail with agent data 929, agent data 929 includes a map 931, digital representation description 933, keys 934, and parameters 921. Map 931 is a list of addresses in network 103. Each address specifies an entity in network 103 that can provide an environment in which agent 925 can operate. The address may for example be an E-mail address or an IP address. Digital representation description 933 may be any information that describes the digital representations the agent is looking for. There may be a filter for the file names and there may also be identification information from the watermark. For example, if the files to be examined are .bmp files, the filter might specify *.bmp, indicating that all files with the .bmp suffix are to be examined. If a watermark key is needed to read the watermark, keys 934 will contain that key and if the messages sent to monitor system 901 are to be encrypted, keys 934 will contain the key to be used in encrypting the messages. Any available technique may be used to keep the keys secure. In a preferred embodiment, the parameters include the email address for messages sent by the agent;
whether to report on files to which agent 925 had no access;
date of last monitoring and whether to check only files updated since that date;
whether to execute code 611 in an active watermark 619; and
termination conditions for agent 925.

Agent 925 is produced by agent generator 923, which can be implemented as a component of digital representation manager 131. Agent generator 923 makes agent 925 from information in management data base 903 and agent parameters 921, which here are shown being provided interactively by a user of monitoring system 901, but may also be stored in management data base 903. The information in management data base 903 includes agent template 905(*i*), which is one of a number of templates that are used together with parameters 921 and other information in management data base 903 to generate agent code 927 for different kinds of agents 925. Suspicious sites 907 is a list of network locations which might be worth examining. One source of information for sites that should be on the list of suspicious sites 907 is of course messages received from previously-dispatched agents. Network information 909 is information about the network. Suspicious sites 907 and network information 909 are used together to make map 931 in agent 925. Digital representation information 911, finally, contains information about the digital representations that the agent will be looking for. The information is used to make DR Description 933.

Information 911(*i*) for a given digital representation or group of digital representations may include a watermark key 913 for the digital representation's watermark and information from the watermark including owner ID 915, user ID 917, and permitted use information 919. User ID 917 is an identification for the user to whom the digital representation was downloaded. Once agent 905 has thus been created by monitor system 901, agent 925 clones itself, makes the clone into the kind of message required for the first entity specified in map 931, and sends the message to the first entity. Thereupon, agent 925 terminates itself.

Figure 10:
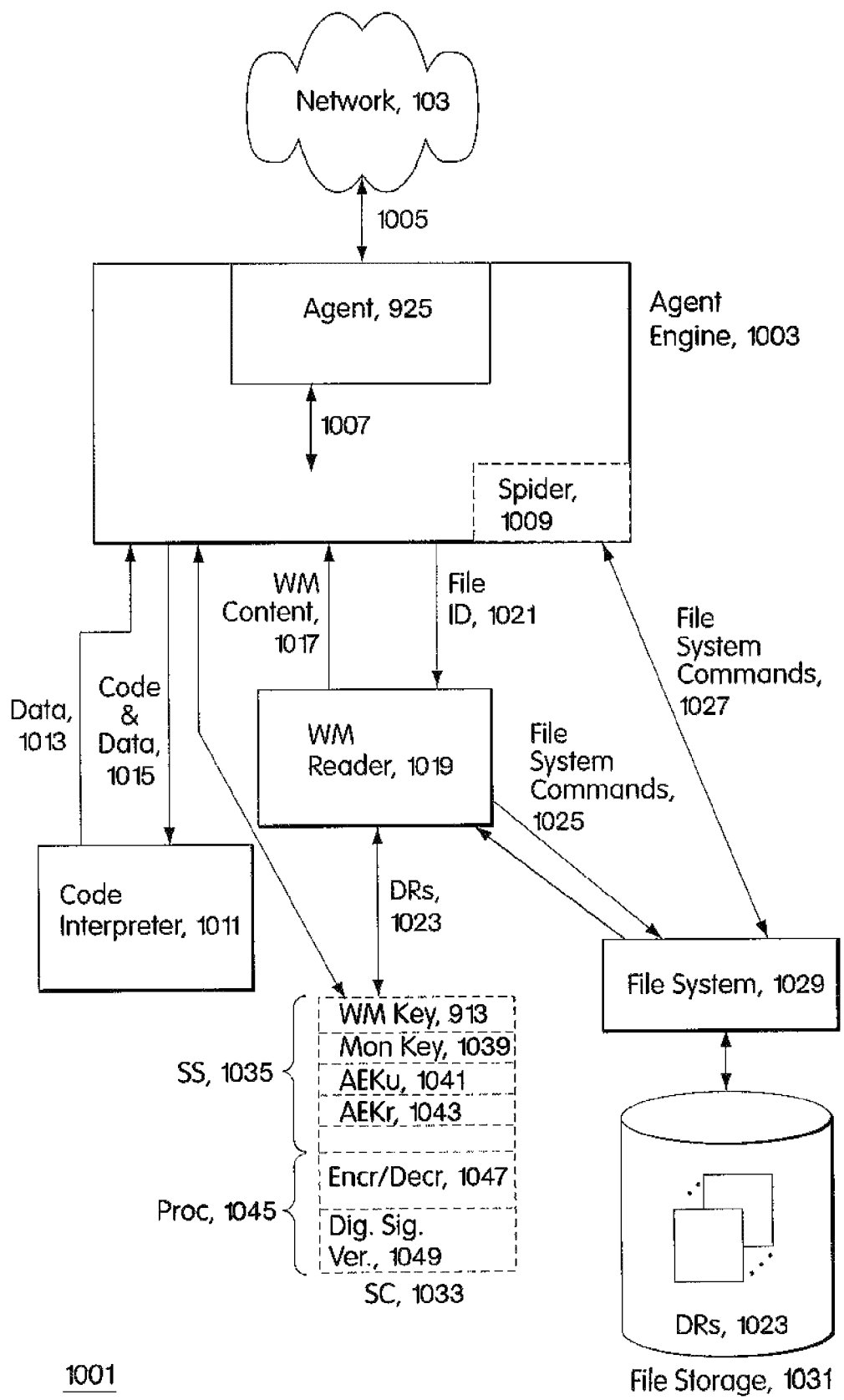
FIG. 10 is a diagram of a system for receiving a watermark agent.

Watermark Agents in Network Nodes: FIG. 10

FIG. 10 shows those components of a network node 1001 which are involved in the monitoring of the node by a watermark agent 925 The components include:
agent engine 1003, which provides the environment in which agent 925 executes its code and which is the entity to which the message containing agent 925 is addressed;
file storage 1031, which contains the digital representations 1023 that are of interest to agent 925;
file system 1029, which makes the digital representations 1023 accessible as files;
watermark reader 1019, which reads the watermarks; and
code interpreter 1011, which interprets code in agent 925 and may also interpret the code in active watermarks, if that code is written in the same language as the code used in agent 925.

SC 1035 is an optional secure coprocessor whose functions will be explained in more detail in the discussion of security.

Operation of components 1001 is as follows: When the message containing agent 925 arrives in agent engine 1003 from network 103, agent engine 1003 extracts agent 925 from the message and, at a convenient time, uses code interpreter 1011 to begin executing its code. What the code does is of course arbitrary. Typically, it will do the following:
1. Send a message to system 901 indicating its arrival in the node;
2. Obtain the file filter from DRDESC 993 and give it to spider 1009 to make a list of files that match the filter;
3. For each file on the list, do the following:
   a. use spider 1009 to get the file ID for the file;
   b. give file 1D1021 to watermark reader 1019, which uses the watermark key from keys 934 to read the watermark, if any;
   c. receive the watermark content 1017;
   d. process watermark content 1017 as specified in code 927. Actions might include sending a message to system 901 or passing the code and data 1015 from an active watermark to code interpreter 1011 for execution and receiving data 1013 in return;
4. When all of the files have been processed,
   a. sending a message to monitor system 901 with summary information about the results of the visit and the next node to be visited;
   b. making a clone of agent 925 and sending the clone to the next address specified in map 931; and
   c. terminating agent 925.

As previously indicated, what a watermark agent can do is essentially arbitrary. If the documents being dealt with by the watermark agent have active watermarks, there are any number of ways of dividing the work of processing of documents of interest between the code in the watermark agent and the code in the active watermark. For instance, in the example above, step 3(d) above could consist simply of executing the code in the document's active watermark.

The actions performed in step 3(d) will typically be performed when the information in the watermark does not match the time or place where agent 925 found the file or the time and/or place are inappropriate for the file's access privileges. The action may be one of a pre-defined set specified by parameters in parameters 921, it may be one defined by agent 925's code 927, or it may be one defined by an active watermark.

Among the predefined actions are:
1. Destroy the file if the file's sensitivity level is very high;
2. Remove the file to a safe place if the sensitivity level is medium;
3. If the sensitivity level is low,
   a. Warn the local administrator or webmaster of the violation if the sensitivity is low,
   b. Warn the recipient of the violation if the sensitivity is low; or
   c. Send a message to the file's owner reporting the violation if the sensitivity is low;
4. If the sensitivity level is very low, send a message to monitor 901 without disturbing the local host and local administrator.

Before going on to the next destination, watermark agent 925 may, wait for a message from monitor 901 containing information about the next destination; the information may include:
The time of the last visit by an agent to the destination;
Information about the destination, for example detailed information about the digital representations to be examined there.

Nontraveling Watermark Agents

An important difference between a watermark agent and a watermark spider is that the watermark agent interacts with the document in the system where the document is being stored or processed, and can thus perform far more functions than a watermark spider can. A further consequence of this difference is that a watermark agent need not travel, but can simply be incorporated as a permanent component of a system. For example, a copier could include a watermark agent that read the watermarks of paper documents being copied and prevented the copier from copying a document when its watermark indicated that the document was not to be copied. An important application of such a non-traveling watermark agent would be to prevent the copying of paper digital cash.

Of course, if the copier had access to a network, even the "non-traveling" watermark agent could at least travel via the network to the copier, and the network would provide a convenient way of updating the copier's watermark agent. "Non-traveling" watermark agents could of course be distributed in a similar fashion to any system accessible via the network.

Security Considerations

In some cases, for example in private military or business networks or systems, agent 925 may not operate in a hostile environment, and monitor 901 and agent engine 1003 may even be implemented as integral parts of the operating system. In most cases, however, agent 925 will be operating in an environment which is hostile in at least three respects:

The node to which agent 925 sends itself is properly suspicious of messages from outside that contain code to be executed on the node;

to the extent that users on the node have violated the conditions under which they received a digital representation, they will want to hide their behavior and/or disable agent 925; and other users of network 103 may be interested in the content of the messages being exchanged between agent 925 and monitor 901.

The first of these problems is the "malicious agent problem". It is general to systems that download and execute code, and the same solutions that are used in those cases can be applied to agent engine 1003 and agent 925. For example, if the watermark agent's code is written in Java, the system on which it is run will have whatever protections are provided by the Java interpreter. If managers of nodes are reasonably certain that agent engine 1003 and agents 925 will not do any damage to the nodes, they can be made to accept engine 1003 and agents 925 simply as a condition of downloading digital representations. For example, the transaction by which a digital representation manager downloads a digital representation to a node might include a message to agent engine 1003 confirming the existence and operability of agent engine 1003. If the message were not properly answered, the digital representation manager might require that the node download and install agent engine 1003 before proceeding further with the transaction.

The remainder of these problems are termed "malicious node problems". They can be solved by standard cryptographic techniques, as described in Schneier, supra. For example, the digital representation manager and each agent engine 1003 might have a public key-private key pair. In that case, network information 909 would include the public key for the agent engine 1003 at a given node and the public keys for the agent engines 1003 in the nodes to be visited would be included in map 931. Any message sent by the digital representation manager or by an agent 925 to an agent engine 1003 can be encrypted using agent engine 1003's public key and any message sent by an agent engine 1003 or an agent 925 to a digital representation manager can be sent using the digital representation manager's public key. The public key for the digital representation manager can of course be included in agent 925's keys 934. Authentication of messages can be done using standard digital signature techniques; for example, agent data 929 might include a digital signature from the digital representation manager for agent 925, messages from the digital representation manager to agent engine 1003 can include the digital representation manager's digital signature, and messages from agent engine 1003 can include agent engine 1003's digital signature.

If the watermarks are made using encryption techniques, as described in E. Koch and J. Zhao, "Towards Robust and Hidden Image Copyright Labeling", supra, the agent must have a way of decrypting the watermark. Depending on the situation, the watermark may be encrypted with the watermark agent's public key and authenticated with a digital signature in the same fashion as other messages to the agent engine or the watermark may have its own key 913. In the former case, the, the watermark agent's private key must be protected and in the latter, watermark key 913 must be protected, since access to the key would permit those intent on stealing digital representations to remove or alter the digital representation's watermark. While agent 925 is in transit, watermark key 913 can be protected by encryption in the same fashion as the rest of the information in agent 925; once agent 925 has been decrypted, watermark key 913 and agent engine 1003's private key must be protected in the node currently being visited by agent 925. Agent engine 1003's private key must further be protected to prevent a user of the node currently being visited by agent 925 from using the private key to decrypt messages addressed to agent engine 1003 or append agent 1003's digital signature.

One way of solving these key protection problems is a secure coprocessor, as described in J. D. Tyger and Bennet Lee, *Secure Coprocessors in Electronic Commerce Applications*, FIRST USENIX WORKSHOP ON ELECTRONIC COMMERCE, JULY 1995. As shown at 1033, a secure coprocessor includes secure storage 1035 and a secure processor 1045. Secure storage 1035 may only be accessed via secure processor 1045, and secure coprocessor 1033 is built in such a fashion that any attempt to access the information in secure coprocessor 1033 other than via secure processor 1045 results in the destruction of the information. Secure coprocessor 1033 is able to write information to and read information from secure storage 1035 and also does encryption and decryption and makes and verifies digital signatures. These operations may be done entirely by executing code stored in secure storage 1035 or by means of a combination of code and specialized hardware devices, as shown at 1047 and 1049. The keys used in encryption, decryption, and in making digital signatures and verifying them are stored in secure storage 1035. Shown in FIG. 10 are WMkey 913 for the watermark, monitor public key 1039, agent engine public key 1041, and agent engine private key 1043. In the case of the public keys, storage in secure storage 1035 is simply a matter of convenience, and secure processor 1045 may provide access to the public keys in response to requests from components of node 1001; in the case of WMkey 913 and agent engine 1003's private key 1043, the decrypted keys 913 and 1043 are used only within secure processor 1033.

In the context of system 1001, when a message encrypted with agent engine 1003's public key 1041 arrives in agent engine 1003, agent engine 1003 uses secure processor 1033 to decrypt the message; if the message contains an agent 925, agent engine 1003 also uses secure processor 1033 to verify that agent 925's digital signature is from the digital representation manager and to decrypt WMkey 913. The decrypted key is not returned to agent engine 1003, but is stored in secure storage 1035. SWM reader 1019 then uses secure coprocessor 1033 to decrypt the watermark in the digital representation currently being checked by agent 925.

Applications Using Watermark Agents

Since a watermark agent is programmed, it can do literally anything. The flexibility of watermark agents is increased when their use is combined with that of active watermarks. One set of applications for watermark agents is monitoring the use of copyrighted digital representations for the copyright owner or a licensing agency. A copyright owner or licensing agency, for example, may use watermark agents to locate unlicensed copies of digital representations or to periodically monitor the use of licensed copies. A document with an active watermark could increment a usage count maintained in agent engine 1003 for a node each time it was printed and agent 925 could read the count on its visit to the node, report the current count value back to management database 903, and reset the counter Another set of applications is monitoring the use of digital representations to avoid liability for infringement. For example, a corporation might want to be sure that it has no unauthorized digital representations in its network and that the authorized ones are being used in accordance with their license terms. The agent can monitor the use of the digital representations in the corporate network in the same fashion as it does for the licensing agency. In this instance, the monitoring might even include destroying illegal copies.

Yet another set of applications is preventing unauthorized copying, scanning, or printing. This can be done by means of "nontraveling" watermark agents on servers and clients in the network or even by means of "nontraveling" watermark agents built into devices such as copiers, scanners, or printers. For example, if a "No copy" watermark is embedded in currency and a photocopier has an agent that looks for such a watermark and inhibits copying when it finds the watermark, the photocopier will not make copies of currency.

Watermark agents can also be used to enforce military or corporate document security rules. In such an application, the document's security classification would be embedded in it as a watermark and the watermark agent would search the military or corporate file systems and networks for documents that were not being dealt with as required by their security classification. Examples would be documents that were in the wrong place or had been kept longer than a predetermined period. Actions taken by the agent can range from reports and warnings through changing the access rights to the document or moving the document to a safe location to immediate destruction of the out-of-place document. Again, the agent that does this need not travel, but may simply be a permanent component of the file system.

Watermark agents, finally, can be used to find lost documents in military or business file systems or networks. If each document has a unique identifier associated with it and that watermark in the document, a watermark agent can simply be given the universal identifier and sent to search the file system or network for the document. Once the agent has found it, it can report its location to whomever sent the agent out.

CONCLUSION

The foregoing Detailed Description has disclosed to those skilled in the relevant arts how to make and use documents with authentication that withstands conversion between an analog form and a digital representation of the document, how to make and use digital representations with active watermarks, and how to make and use watermark agents, including mobile watermark agents and has further disclosed the best mode presently known to the inventors for making such authentications, making active watermarks, and making watermark agents. The disclosed techniques are exceedingly general and may be implemented in many different ways for many different purposes. For example, the authentication techniques may be based on any kind of semantic information and there are many ways of deriving the authentication information from the semantic information, placing the authentication information in the digital representation or the analog form, and comparing the authentication information. Similarly, the program code for an active watermark may be written in any programming language, may be in source or object form, and may, when executed, perform arbitrary operations. Watermark agents, too, may perform arbitrary actions and employ various techniques for sending messages and traveling from node to node in a network. The watermark agents can of course perform authentication information and can execute code from active watermarks.

Since the techniques are so general and may be implemented in any number of ways, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. An apparatus for monitoring watermarked digital representation in a system which is not a dedicated digital rights management system, the system including a processor and a memory device to which the processor has access, and the system being capable of performing an action on the watermarked digital representation which is potentially a misuse of the watermarked digital representation, the apparatus being resident in the memory device and the apparatus comprising:
    a watermark agent that includes a program which, when executed, responds to the watermark when the agent determines on the basis of the watermark that the action is an actual or potential misuse of the watermarked digital representation by causing the system to respond to the actual or potential misuse; and
    a watermark agent engine that, when executed by the processor, provides an environment in the system for executing the watermark agent's program and executes the watermark agent's program in the environment.

2. The apparatus for responding to the watermark set forth in claim 1 wherein:
    the watermark agent and watermark agent engine are permanently resident in the memory device.

3. The apparatus for responding to the watermark set forth in claim 2 wherein:
    the system makes the watermarked digital representation from an analog form of the watermarked digital representation.

4. The apparatus for responding to the watermark set forth in claim 1 wherein:
    the system is a node in a network;
    the watermark agent engine is addressable in the network; and
    the watermark agent engine receives the watermark agent from another node in the network.

5. The apparatus for responding to the watermark set forth in claim 4 wherein:
    the system receives the watermarked digital representation from another node in the network; and
    the other node provides the watermarked digital representation to the system only if the system has the watermark agent engine.

6. The apparatus for responding to the watermark set forth in claim 5 wherein:
    the system receives the watermark agent engine from another node in the network.

7. The apparatus for responding to the watermark set forth in claim 4 wherein:
    the watermark agent sends itself from the other node to the watermark agent engine.

8. The apparatus for responding to the watermark set forth in claim 7 wherein:
the watermarked digital representation is one of a set thereof that are resident in the system, and when the watermark agent has monitored all of the watermarked digital representations in the set, the watermark agent sends itself to a further node in the network.

9. The apparatus for responding to the watermark set forth in claim 1 wherein:
the watermark agent further monitors a digital representation that should have a watermark but does not.

10. The apparatus for responding to the watermark set forth in claim 1 wherein:
the system is a node in a network; and
the response of the system is causing the processor to send a message concerning the watermarked digital representation to another node in the network.

11. The apparatus for responding to the watermark set forth in claim 10 wherein:
the other node in the network monitors performance of the action involving the watermarked digital representation in the system; and
the message concerns the action.

12. The apparatus for responding to the watermark set forth in claim 1 wherein:
the response of the system is causing the processor to send a message concerning the watermarked digital representation to another component of the system.

13. The apparatus for responding to the watermark set forth in claim 12 wherein:
the other component monitors performance of the action involving the watermarked digital representation in the system; and
the message concerns the action.

14. The apparatus for responding to the watermark set forth in claim 1 wherein:
the response of the system is to cause the processor to perform an operation on the watermarked digital representation.

15. The apparatus for responding to the watermark set forth in claim 1 wherein:
the watermark contains a watermark program which is executable in the watermark agent engine; and
the watermark agent responds to the watermark by causing the watermark agent engine to execute the watermark program.

16. An apparatus in a node in a network for monitoring performance of an action involving one or more watermarked digital representations in other nodes in the network, the node including a processor and a memory device to which the processor has access and the apparatus comprising:
an agent generator in the memory device that, when executed by a processor, generates a watermark agent, the watermark agent including a program that, when executed, reads the watermarked digital representation's watermark in one or more other nodes in which the watermark agent is resident and determines whether the action has been performed and thereupon sends a message concerning the performance to the apparatus for monitoring performance, the watermark agent proceeding to the one or more other nodes, becoming resident therein, and the program being executed therein; and
a message handler in the memory device that, when executed by the processor, receives the message sent by the watermark agent from the one or more other nodes in which the watermark agent is resident and deals therewith.

17. The apparatus for monitoring performance of the action involving the watermarked digital representation set forth in claim 16 wherein:
the watermark agent further includes a map specifying locations of the one or more other nodes.

18. The apparatus for monitoring performance of the action involving the watermarked digital representation set forth in claim 17 further comprising:
a list of other nodes of interest in the memory device that is accessible to the agent generator when executed; and
the agent generator uses the list of other nodes of interest to make the map.

19. The apparatus for monitoring performance of the action involving the watermarked digital representation set forth in claim 17 wherein
the apparatus monitors whether the action conforms to a right in the watermarked digital representation;
the apparatus further comprises information about the right in memory accessible to the agent generator;
the watermark agent further contains a description of the right which affects behavior of the watermark agent's program; and
the agent generator uses the information about the right to make the description of the right.

20. The apparatus for monitoring performance of the action involving the watermarked digital representation set forth in claim 16 wherein
the apparatus further comprises one or more agent templates in the memory device, an agent template specifying a kind of watermark agent and
when executed, the agent generator employs a given one of the templates to generate a watermark agent belonging to the given template's kind.

21. A method practiced in a node of a network of monitoring performance of an action involving a set of watermarked digital representations resident in the node, the node including a processor and a memory device accessible to the processor and the method comprising the steps performed by the processor of:
receiving a watermark agent in the node and storing the watermark agent in the memory device, the watermark agent including a program which, when executed in the node, reads the watermarks in the watermarked digital representations of the set, makes a determination whether the action has been performed and/or is potentially performable for each of the watermarked digital representations, and responds to the determination; and
executing the program in the node.

22. The method set forth in claim 21 wherein:
when executed by the processor, the program further sends a message indicating the determination.

23. The method set forth in claim 22 wherein:
the message is sent to an entity in the node.

24. The method set forth in claim 22 wherein:
the message is sent to an entity in another node in the network.

25. The method set forth in claim 21 wherein:
the program further causes the watermark agent to send itself to another node in the network.

* * * * *